United States Patent
Kim et al.

(10) Patent No.: US 10,433,373 B2
(45) Date of Patent: Oct. 1, 2019

(54) COOKING APPARATUS

(71) Applicant: LG ELECTRONICS INC., Seoul (KR)

(72) Inventors: Wansoo Kim, Seoul (KR); Yangkyeong Kim, Seoul (KR); Byungkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 520 days.

(21) Appl. No.: 15/130,747

(22) Filed: Apr. 15, 2016

(65) Prior Publication Data

US 2016/0309546 A1    Oct. 20, 2016

(30) Foreign Application Priority Data

Apr. 16, 2015    (KR) ................. 10-2015-0054022
Apr. 16, 2015    (KR) ................. 10-2015-0054023

(51) Int. Cl.
| | |
|---|---|
| *H05B 6/12* | (2006.01) |
| *H05B 6/06* | (2006.01) |
| *A47J 36/24* | (2006.01) |
| *A47J 36/34* | (2006.01) |
| *A47J 43/07* | (2006.01) |
| *A47J 43/044* | (2006.01) |

(52) U.S. Cl.
CPC ........ *H05B 6/1209* (2013.01); *A47J 36/2483* (2013.01); *A47J 36/34* (2013.01); *A47J 43/0705* (2013.01); *H05B 6/062* (2013.01); *H05B 6/12* (2013.01); *A47J 2043/04481* (2013.01); *Y02B 40/123* (2013.01)

(58) Field of Classification Search
CPC ........ H05B 6/1209; H05B 6/062; H05B 6/12; A47J 36/2483; A47J 36/34; A47J 43/0705
USPC ........................................................ 219/622
See application file for complete search history.

(56) References Cited

U.S. PATENT DOCUMENTS

| | | | |
|---|---|---|---|
| 2006/0254429 A1* | 11/2006 | Sinton | A47J 27/004 99/348 |
| 2008/0029081 A1* | 2/2008 | Gagas | F24C 15/2035 126/299 D |
| 2009/0194527 A1* | 8/2009 | Okada | H05B 6/1263 219/624 |
| 2009/0314771 A1* | 12/2009 | Okada | H05B 6/062 219/647 |

(Continued)

FOREIGN PATENT DOCUMENTS

| | | |
|---|---|---|
| JP | 2007-319515 | 12/2007 |
| JP | 2007319515 A * | 12/2007 |

(Continued)

OTHER PUBLICATIONS

European Search Report dated Aug. 17, 2016 issued in Application No. 16165009.8.

*Primary Examiner* — Dana Ross
*Assistant Examiner* — Kuangyue Chen
(74) *Attorney, Agent, or Firm* — KED & Associates, LLP (57) ABSTRACT

A cooking apparatus is disclosed, which comprises a first housing provided with an inverter for induction heating; and a second housing including a working coil to which a current supplied from the inverter is transferred, heated as a container for receiving cooking food is arranged thereon, wherein the first housing and the second housing constitute spaces detached from each other.

9 Claims, 10 Drawing Sheets

(56) References Cited

U.S. PATENT DOCUMENTS

2011/0309069 A1* 12/2011 Fujinami .............. H05B 6/1209
219/622
2012/0097664 A1* 4/2012 Kataoka ............... H05B 6/1263
219/632

FOREIGN PATENT DOCUMENTS

| WO | WO 2008-022685 | 2/2008 | |
|---|---|---|---|
| WO | WO 2008022685 A1 * | 2/2008 | ............ F24C 15/103 |
| WO | WO 2013-134785 | 9/2013 | |

* cited by examiner

COOKING APPARATUS

This application claims the benefit of the Korean Patent Application Nos 10-2015-0054022 filed on Apr. 16, 2015 and 10-2015-0054023 filed on Apr. 16, 2015, which is hereby incorporated by reference as if fully set forth herein.

BACKGROUND OF THE INVENTION

Field of the Invention

The present invention relates to a cooking apparatus, and more particularly, to a cooking apparatus in which a member where a container for receiving cooking food has a low height. Also, the present invention relates to a cooking apparatus, and more particularly, to a cooking apparatus of which user convenience is improved.

Discussion of the Related Art

Generally, an electric range is a cooking apparatus provided with a radiant heating module or an induction heating module, wherein the radiant heating module cooks food by using radiant heat generated by heating a heating coil inside a main body constituting appearance of the electric range, and the induction heating module cooks food by generating an eddy current through a current sent to a magnetic coil and thus heating a cooking container.

In this case, the induction heating module includes an assembly board, an induction heater provided above the assembly board, and an inverter provided below the assembly board to operate the induction heater. As the assembly board is installed, the induction heating module is installed in the main body of the electric range.

At this time, since the inverter is a circuit board provided with various electronic parts, if the induction heating module is installed inside the main body of the electric range, the induction heating module should be spaced apart from a lower board of the main body at a predetermined interval.

Therefore, problems occur in that the electric range becomes thick and a height of a cooking space where the electric range is arranged is increased, whereby the electric range occupies much space of a kitchen and causes inconvenience of a user.

Meanwhile, a general IH pressure cooker has a lid which is not completely detached from a main body of the pressure cooker, whereby a problem occurs in that it is difficult to remove leftover rice/oil stuck into the pressure cooker.

SUMMARY OF THE INVENTION

Accordingly, the present invention is directed to a cooking apparatus that substantially obviates one or more problems due to limitations and disadvantages of the related art.

An object of the present invention is to provide a cooking apparatus in which a member where a container for receiving cooking food is arranged has a low height.

Another object of the present invention is to provide a cooking apparatus that may be folded or unfolded depending on the need of a user.

Still another object of the present invention is to provide a cooking apparatus that may easily be cleaned by a user.

Further still another object of the present invention is to provide a cooking apparatus that may cook food by using various containers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a cooking apparatus comprises a first housing provided with an inverter for induction heating; and a second housing including a working coil to which a current supplied from the inverter is transferred, heated as a container for receiving cooking food is arranged thereon, wherein the first housing and the second housing constitute spaces detached from each other. At this time, the first housing and the second housing constitute spaces independent from each other, and an element provided in the first housing and an element provided in the second housing may be detached from each other.

The first housing and the second housing may be arranged to be perpendicular to each other. Therefore, the first housing is in contact with a wall of a kitchen, and the second housing is in contact with a floor, whereby a user may use the cooking apparatus after moving the cooking apparatus to a stable position.

A relative position of the first housing may be changed with respect to the second housing. A folding angle of the first housing may be changed with respect to the second housing. For example, the first housing and the second housing are folded to be overlapped with each other while the cooking apparatus is being moved, and the first housing and the second housing are unfolded while the cooking apparatus is being used, whereby the user may easily use the cooking apparatus.

The cooking apparatus further comprises a hinge unit connecting the first housing with the second housing, wherein the first housing and the second housing may be folded to be overlapped with each other based on the hinge unit. The hinge unit may be divided into a portion coupled with the first housing and a portion coupled with the second housing.

The inverter and the working coil are electrically connected with each other by an electric wire, and a part of the electric wire may be arranged in the first housing, and the other part of the electric wire may be arranged in the second housing. The inverter and the working coil may be arranged to be detached from each other on their respective spaces different from each other, but the current may be moved by the electric wire.

The first housing is provided with a cooling fan for cooling the inverter, and the inverter includes a PCB substrate, and the PCB substrate may be arranged so as not to be overlapped with the cooling fan. A thickness of the first housing becomes thin, whereby a space where the user arranges and uses the cooking apparatus may be obtained widely.

The first housing may be provided with a display module that provides information related to the cooking apparatus. The user may acquire related information through the display module, and may identify whether the cooking apparatus is normally operated.

The first housing includes a motor for providing a rotational force and a transfer member for transferring the rotational force of the motor, and cooking food inside the container may be stirred by the rotational force transferred by the transfer member.

According to the present invention, since the cooking apparatus may be unfolded when a user uses it and may be folded when the user does not use it, it is convenient for the user to carry it.

Also, according to the present invention, since the member where the container for receiving cooking food is arranged has a low height, the user may cook food with stability and convenience.

Also, according to the present invention, since the user may stir the cooking food, the user may cook the food with convenience.

Also, according to the present invention, since an induction heating module, a main body and a lid may be detached from one another, it is convenient to clean the cooking apparatus by detaching the parts from one another after cooking, whereby convenience for health control may be provided.

The induction heating module may wirelessly supply a power to the main body. The supplied power may be used for heating or driving, whereby heating performance may be improved or various functions may be performed.

Also, according to the present invention, since the induction heating module may be detached from the main body to heat another container, the user may cook food by using various containers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

For clarification and convenience of description, size and shape of each element shown in the drawings may be enlarged or downsized. Also, the terms defined particularly considering elements and operation of the present invention may be modified depending on intention of a user or person skilled in the art or practices. These terms used herein should be understood not simply by the actual terms used but by the meaning lying within and the description disclosed herein.

Figure 1:
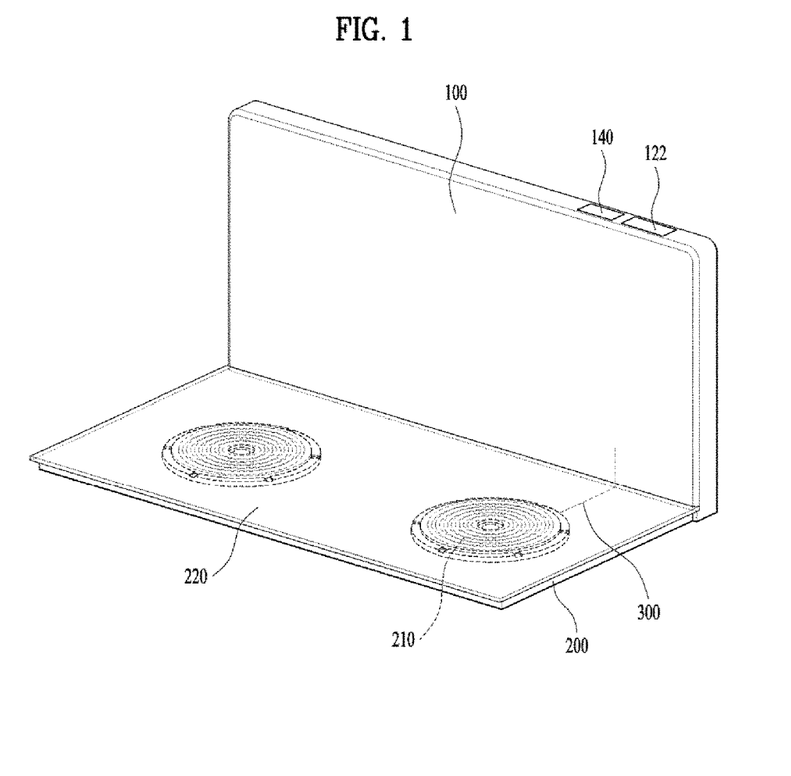
FIG. 1 is a view illustrating one embodiment of the present invention viewed from the front.
Figure 2:
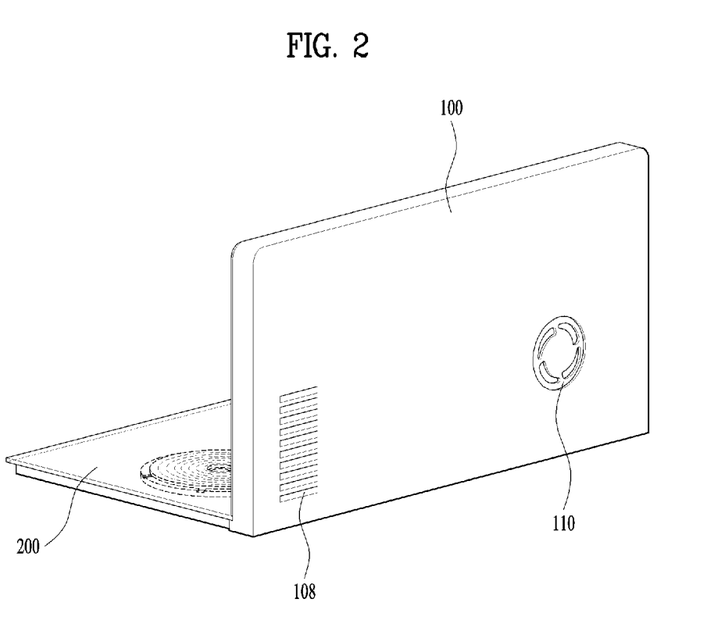
FIG. 2 is a view illustrating the embodiment of FIG. 1 viewed from the rear.
Figure 3:
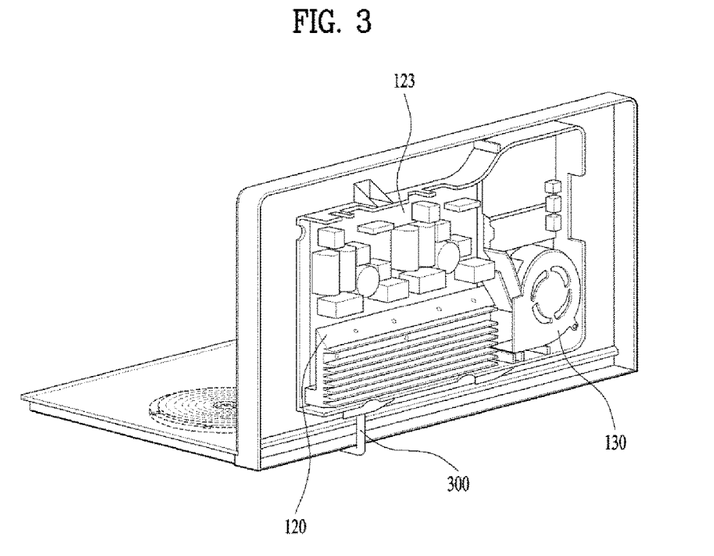
FIG. 3 is a view partially illustrating the inside of FIG. 2.

FIG. 1 is a view illustrating one embodiment of the present invention viewed from the front, FIG. 2 is a view illustrating the embodiment of FIG. 1 viewed from the rear, and FIG. 3 is a view partially illustrating the inside of FIG. 2.

Referring to FIGS. 1 to 3, one embodiment of the present invention includes a first housing 100 and a second housing 200, which constitute two spaces detached from each other.

That is, the first housing 100 and the second housing 200 may constitute individual spaces similar to a cuboid shape, and elements required within the individual spaces may be arranged in the first housing 100 and the second housing 200.

The first housing 100 is provided with an inverter 120 for induction heating. The inverter 120 includes a PCB substrate 123, in which a plurality of elements are packaged.

The first housing 100 may be provided with a cooling fan for cooling the inverter 120. At this time, the PCB substrate 123 may be arranged so as not to be overlapped with the cooling fan 130, whereby the first housing 100 may not become thick.

Also, the first housing 100 may be provided with a ventilator 110 that may emit the air generated by the cooling fan 130 to the outside of the first housing 100. Preferably, the ventilator 110 is arranged to be adjacent to an emission direction of the air from the cooling fan 130 and arranged on an extension along the emission direction of the air.

The first housing 100 is provided with a through hole 108 in addition to the ventilator 110, so as to allow the air from the through hole 108 to enter the first housing 100 without emitting the air from the ventilator 110. The air enters the first housing 100 through the through hole 108 and is emitted from the inside of the first housing 100 through the ventilator 110, whereby the inverter 120 may be cooled efficiently.

At this time, the through hole 108 may be formed at the left side of the first housing 100 where the inverter 120 is arranged, and the ventilator 110 may be formed at the right side of the first housing 100 where the inverter 120 is arranged. The inverter 120 may be cooled by the air flow formed by the cooling fan 130, that is, the air flow from the left side to the right side inside the first housing 100.

The first housing 100 may be provided with a display module 140 that provides information related to the cooking apparatus. The display module 140 may be provided at a portion directed toward the front of the first housing 100 such that the user may identify state information while cooking food.

Also, the first housing 100 may be provided with a manipulating module 122 that may manipulate the cooking apparatus. The manipulating module 122 may provide the user with an interface to allow the user to turn on/off the inverter 120 or control a heating temperature of the cooking apparatus.

The second housing 200 includes a working coil 210 to which a current supplied from the inverter 120 is transferred, and a container for receiving cooking food may be placed on the working coil 210 and then heated.

An upper surface 220 of the second housing 200 is arranged such that the working coil 210 is not exposed externally, and may be made of an insulating material.

The container may be placed on the upper surface 220 to heat cooking food, wherein the inverter 120 is arranged at a position strayed from a space extended to a lower portion of the upper surface 220.

Meanwhile, the working coil 210 is arranged on the second housing 200 to form a plurality of concentric circles, whereby the container may be placed on the concentric circles to heat cooking food.

The first housing 100 and the second housing 200 may be arranged to be perpendicular to each other. The first housing 100 and the second housing 200 may be fixed to each other, whereby relative positions of the first housing 100 and the second housing 200 may be set uniformly.

At this time, portions corresponding to corners of the first housing 100 and the second housing 200 may be coupled to each other, whereby the first housing 100 and the second housing 200 may be fixed to each other.

Since the first housing 100 and the second housing 200 constitute their respective spaces, they may be arranged at their respective shapes different from each other. Since the container is placed on the second housing 200 to cook food, a portion having a relatively wide area on the second housing 200 may be arranged in a horizontal direction. On the other hand, since one surface of the first housing 100 is arranged to face the place where the container is arranged, a portion having a relatively wide area on the first housing 100 may be arranged in a vertical direction.

The inverter 120 and the working coil 210 are electrically connected to each other by an electric wire 300. A part of the electric wire 300 may be arranged on the first housing 100, and the other part of the electric wire 300 may be arranged on the second housing 200.

The inverter 120 and the working coil 210 should be connected to each other by the electric wire 300 to flow a current. However, since the inverter 120 is arranged on the first housing 100 and the working coil 210 is arranged on the second housing 200, the inverter 120 and the working coil 210 are received in their respective spaces different from each other, whereby the electric wire 300 electrically connects two spaces, that is, the first housing 100 and the second housing 200 with each other. That is, the electric wire 300 may partially be arranged in an inner space of the first housing 100 and partially be arranged in an inner space of the second housing 200 so as to transfer the current supplied from the inverter 120 arranged on the first housing 100 to the working coil 210 arranged on the second housing 200.

Meanwhile, the electric wire 300 may be arranged to pass through the portion where the first housing 100 and the second housing 200 adjoin each other, whereby the inverter 120 and the working coil 210 may electrically be connected with each other.

In the present invention, the inverter 120 and the working coil 210 may not be included in one space, for example, the first housing 100 or the second housing 200, whereby a height of a member where the container is arranged may be lowered. Therefore, even though the cooking apparatus is arranged on an existing sink of a kitchen, the height of the member is not increased.

For example, if the inverter 120 and the working coil 210 are arranged on the second housing 200, a problem occurs in that the size of the second housing 200 is increased. Also, if the inverter 120 and the working coil 210 are arranged to be stacked on the second housing 200, a problem occurs in that the thickness of the second housing 200 is increased to increase the height of the second housing 200. If the height of the second housing 200 is increased, the height of the member where the container is arranged becomes too high when the user arranges the container on a place such as a sink of a kitchen, whereby inconvenience in use of the cooking apparatus may be caused.

In this embodiment, two spaces are detached from each other, and different elements are arranged in the respective spaces, whereby the respective spaces may become thin.

Figure 4:
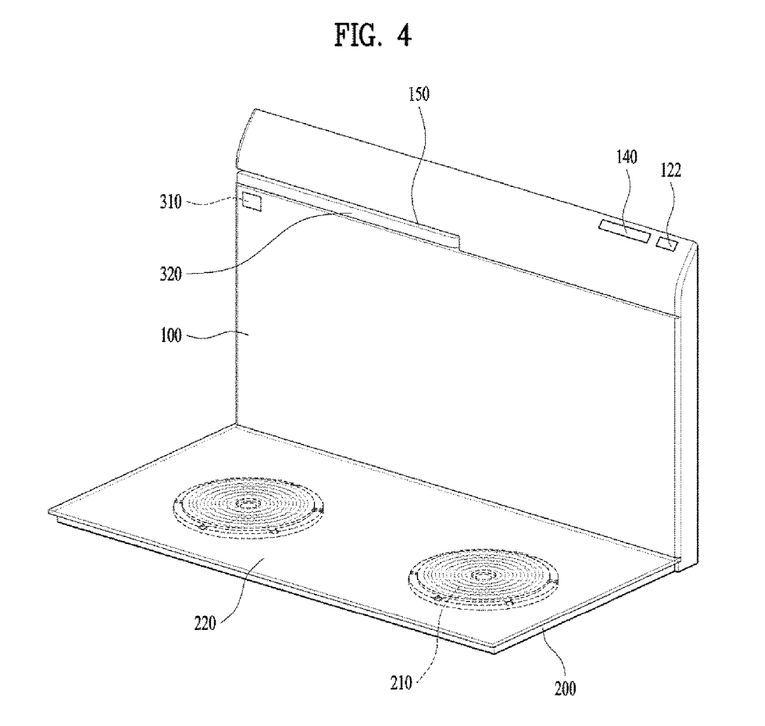
FIG. 4 is a view illustrating another embodiment of the present invention viewed from the front.
Figure 5:
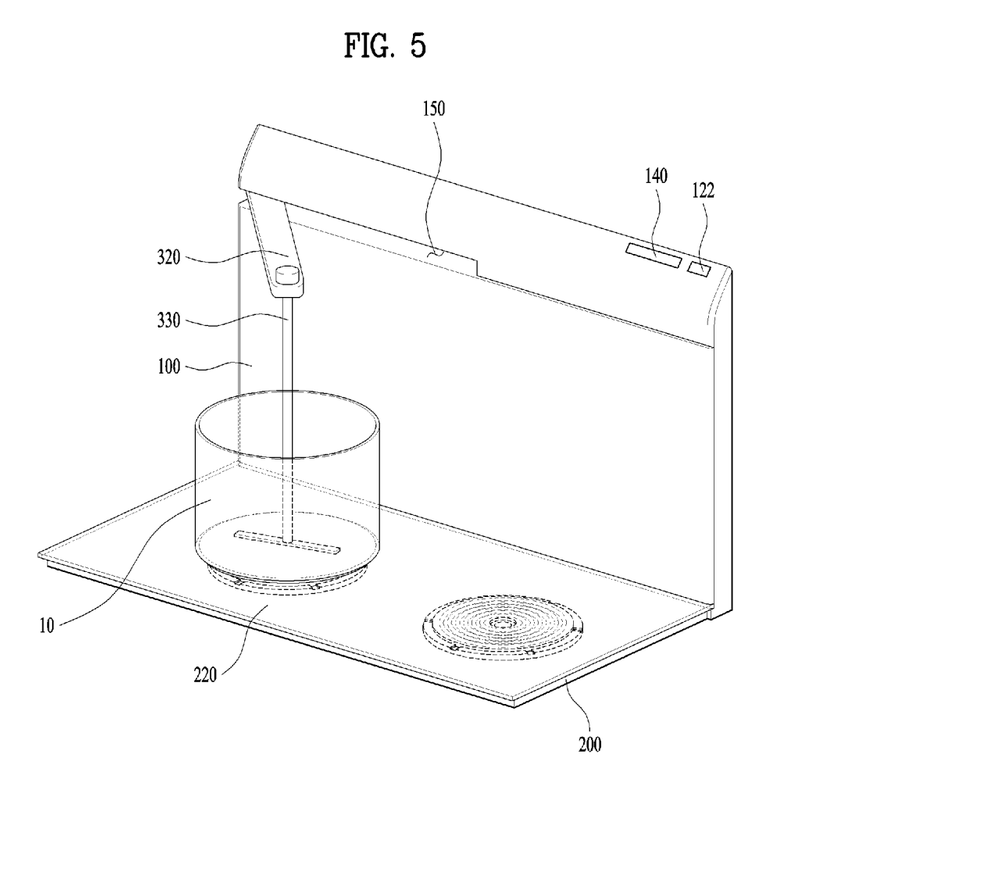
FIG. 5 is a view illustrating an operation of FIG. 4.

FIG. 4 is a view illustrating another embodiment of the present invention viewed from the front, and FIG. 5 is a view illustrating an operation of FIG. 4.

Another embodiment of the present invention will be described with reference to FIGS. 4 and 5, and repeated description of the aforementioned embodiment will be omitted.

In another embodiment, the first housing 100 may be provided with a member that may stir cooking food inside the container 10.

That is, a transfer member 320 may rotatably be coupled to the first housing 100, and may be coupled to an arm 330 that may be rotated.

The arm 330 may be provided with a wing therebelow, whereby cooking food inside the container 10 may be rotated if the arm 330 is rotated.

For example, if cooking food should be stirred continuously like broth while being heated, the wing of the arm 330 may be rotated such that the cooking food may be stirred continuously while being cooked.

A motor 310 is provided at one end of the transfer member 320, and may provide a rotational force. At this time, the rotational force generated in the motor 310 may be transferred to the arm 330 through the transfer member 320, whereby the arm 330 may finally be rotated.

The transfer member 320 may be comprised of an element such as a chain or gear therein, to transfer the rotational force of the motor 310 to the arm 330.

The second housing 200 may be provided with an insertion portion 150 into which the transfer member 320 may be inserted by rotation. The insertion portion 150 may be formed to be the same as or greater than the transfer member 320. In this case, if the transfer member 320 is rotated, the transfer member 320 may fully be inserted into the insertion portion 150, whereby esthetic appearance of the cooking apparatus may be obtained.

The user may rotate the transfer member 320 to allow the transfer member 320 to be taken out of the insertion portion 150 if necessary only, and may maintain the inserted state of the transfer member 320 into the insertion portion 150 if not so.

Meanwhile, the arm 330 may detachably be provided in the transfer member 320, whereby the arm 330 may be detached from the transfer member 330 and kept in another place when it is not used.

Figure 6:
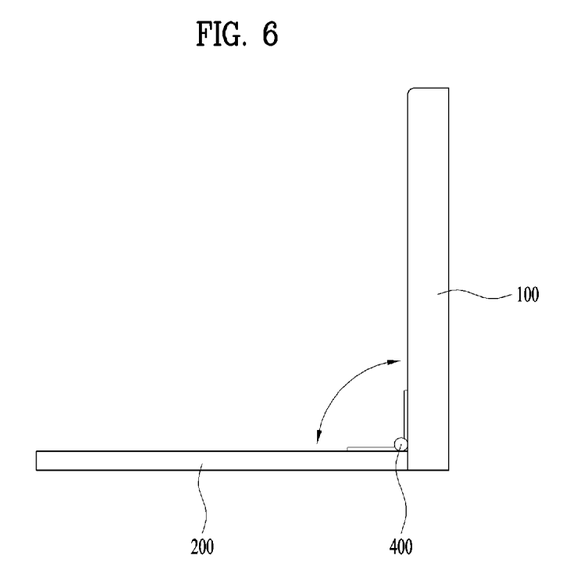
FIG. 6 is a view illustrating still another embodiment of the present invention.

FIG. 6 is a view illustrating still another embodiment of the present invention.

Still another embodiment will be described based on a difference from the aforementioned one embodiment or the aforementioned another embodiment with reference to FIG. 6, and repeated description of the aforementioned embodiments will be omitted.

The relative position of the first housing 100 may be changed with respect to the second housing 200.

A hinge unit 400 that connects the first housing 100 with the second housing 200 may further be provided. The first housing 100 and the second housing 200 may be folded to be overlapped with each other based on the hinge unit 400.

When the cooking apparatus is used, that is, when the container is arranged on the second housing 200 to heat cooking food, the first housing 100 and the second housing 200 may be unfolded such that the first housing 100 and the second housing 200 may not be overlapped with each other. At this time, the first housing 100 and the second housing 200 may be unfolded as much as an angle allowed by the hinge unit 400.

When the cooking apparatus is not used, the first housing 100 and the second housing 200 may be folded to be overlapped with each other, whereby the user may keep the cooking apparatus in a small space or easily carry the cooking apparatus.

Meanwhile, even though the first housing 100 and the second housing 200 are folded or unfolded, the inverter 120 and the working coil 210 may be connected with each other by the electric wire. Therefore, the electric wire may connect the inner space of the first housing 100 with the inner space of the second housing 200 regardless of folding or unfolding of the first housing 100 and the second housing 200.

Figure 7:
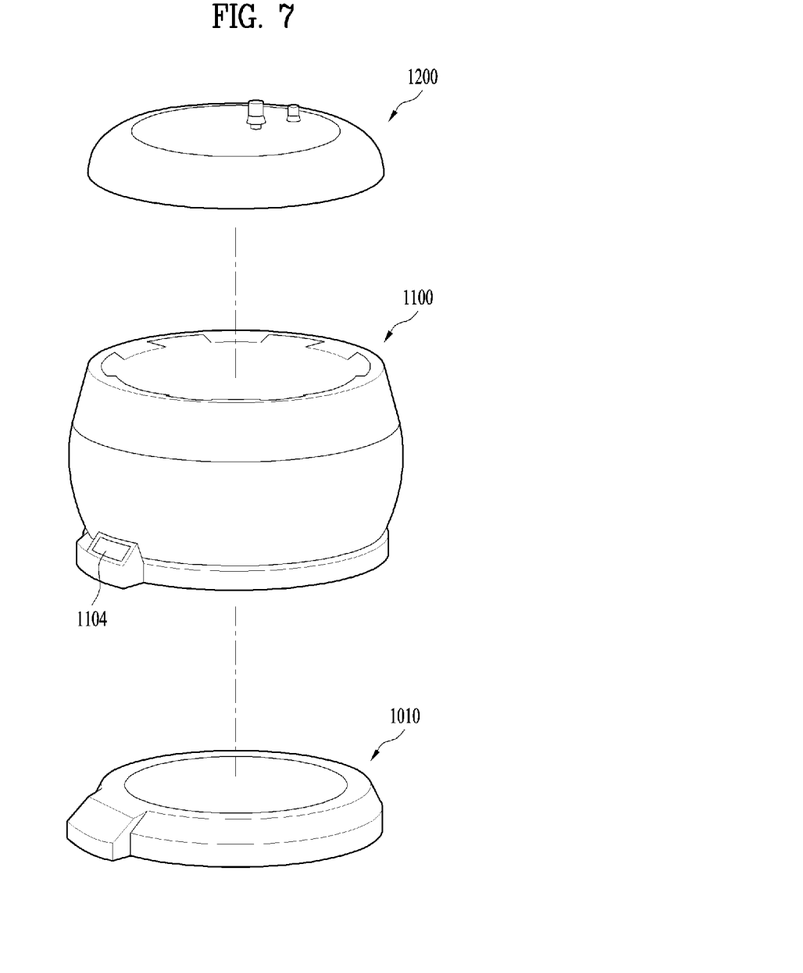
FIG. 7 is an exploded perspective view illustrating a cooking apparatus according to still another embodiment of the present invention.
Figure 8:
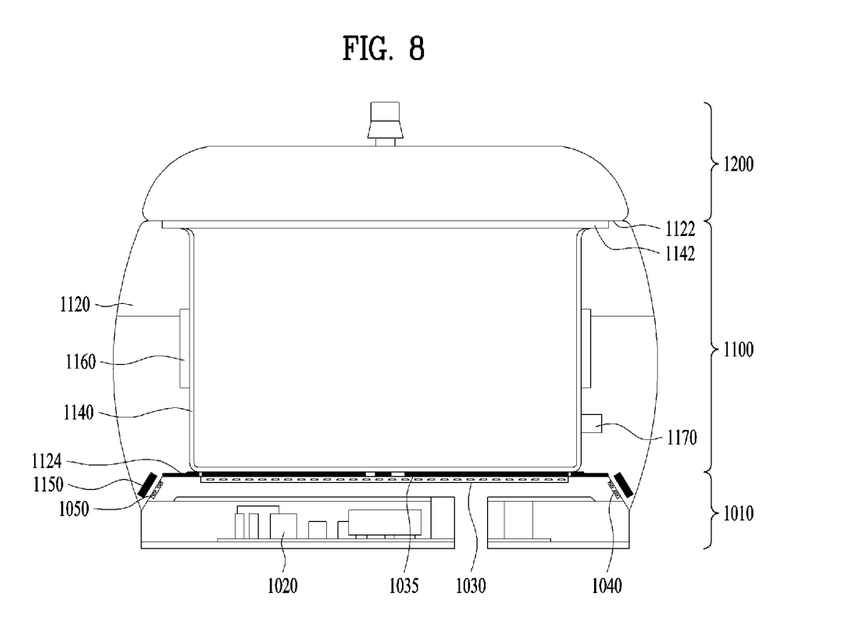
FIG. 8 is a cross-sectional view illustrating an assembled state of FIG. 7.
Figure 9:
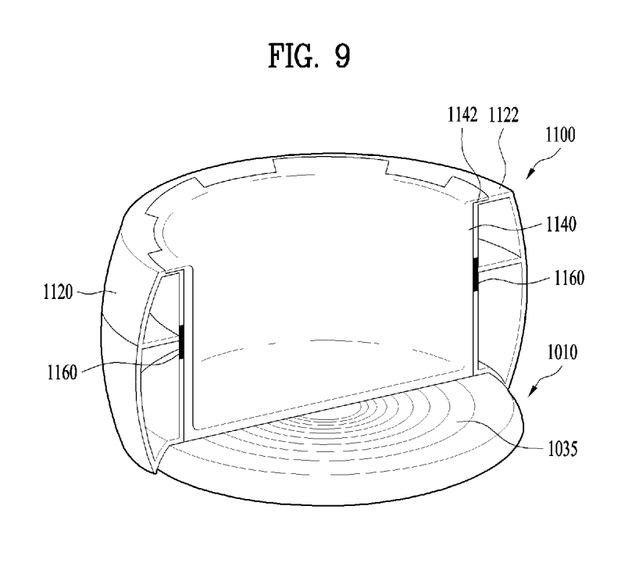
FIG. 9 is a view illustrating another aspect of FIG. 8.

FIG. 7 is an exploded perspective view illustrating a cooking apparatus according to still another embodiment of the present invention, FIG. 8 is a cross-sectional view illustrating an assembled state of FIG. 7, and FIG. 9 is a view illustrating another aspect of FIG. 8.

Afterwards, the cooking apparatus according to the embodiment of FIG. 7 includes a heating plate portion provided with an inverter and a working coil for induction heating, a container portion provided with a space, in which cooking food is received, and heated by the working coil, and a lid portion for opening or closing the space in which the cooking food is received. The cooking apparatus may be characterized in that the heating plate portion, the container portion and the lid portion may detachably be provided.

The aforementioned container portion includes a housing constituting appearance, and a container arranged inside the housing, comparting a space heated by the working coil and in which cooking food is received. The container portion is provided with a recess into which the heating plate portion is partially inserted and fixed. The recess may be formed in the housing, to be recessed towards the container.

In this case, the heating portion may be provided with a transmission coil for wirelessly transmitting a power, and the container portion may be provided with a reception coil for wirelessly receiving a power.

The container portion may be provided with a temperature sensor for measuring a temperature, and the power received by the reception coil may be supplied to the temperature sensor.

The container portion may be provided with a display module displaying a temperature measured by the temperature sensor, and the power received by the reception coil may be supplied to the display module.

The container portion may be provided with a heater for heating a side space in which cooking food is received, and the power received by the reception coil may be supplied to the heater.

Referring to FIGS. 7 to 9, the cooking apparatus according to still another embodiment of the present invention includes a heating plate portion 1010 provided with an inverter 1020 and a working coil 1030 for induction heating, a container portion 1100 provided with a space, in which cooking food is received, and heated by the working coil 1030, and a lid portion 1200 for opening or closing the space in which the cooking food is received.

The heating plate portion 1010 may have a predetermined thickness to be provided with the inverter 1020 and the working coil 1030 therein.

An insulating plate 1035 made of an insulating material is provided at an upper portion of the heating plate portion 1010. The insulating plate 1035 may be made of a glass or ceramic material to insulate the inside of the heating plate portion 1010 from the outside thereof.

The inverter 1020 may control the current supplied to the working coil 1030 to stably supply the current of a level set in the working coil 1030.

The working coil 1030 may be arranged on the heating plate portion 1010 to form concentric circles, thereby heating the container portion 1100.

The container portion 1100 includes a housing 1120 constituting appearance, and a container 1140 arranged inside the housing 1120, comparting a space heated by the working coil 1030 and in which cooking food is received.

At this time, the housing 1120 is not heated by the working coil 1030 but the container 1140 is preferably heated by the working coil 1030. Therefore, the user may not get burned even though the user touches the housing 1120 in a state that cooking food is heated by the working coil 1030.

The container 1140 is made of a material that is heated by electromagnetic waves generated by the working coil 1030 to supply heat to the cooking food received therein.

The housing 1120 constitutes appearance, whereas the container 1140 is received in the housing 1120 to receive cooking food therein. Therefore, the container 1140 is made of a material that does not generate a problem sanitarily even though the cooking food is in contact with the container 1240.

The container portion 1100 is provided with a recess 1124 into which the heating plate portion 1010 is partially inserted and fixed. The recess 1124 may be formed in the housing 1120, to be recessed towards the container 1140.

According to the cooking apparatus, the container 1140 in which the cooking food is received is heated by an induction current. Therefore, if a distance of the container 1140 is far away from the working coil 1030, energy efficiency is rapidly reduced. Therefore, in the present invention, the working coil 1030 and the container 1140 may be arranged to be adjacent to each other, whereby whole energy efficiency may be improved.

Meanwhile, a protrusion 1050 having a protruded shape may be formed at an upper portion of the heating plate portion 1010, where the insulating plate 1035 is arranged.

The protrusion 1050 may fixedly be inserted into the recess 1124. Therefore, the user may recognize that the container portion 1100 has been stably coupled with the heating plate portion 1010 in a state that the protrusion 1050 is inserted into the recess 1124.

At this time, the recess 1124 and the protrusion 1050 may have shapes corresponding to each other.

If the recess 1124 has a shape of which sectional width is reduced towards an upper portion, the protrusion 1050 also has a shape of which sectional width is reduced towards an upper portion, whereby the recess 1124 and the protrusion 1050 may stably be engaged with each other.

That is, the recess 1124 may have a cylindrical shape of which radius is reduced towards the upper portion, and the protrusion 1050 may have a shape corresponding to that of the recess 1124. Since the sectional width is reduced towards the upper portion, the user may couple the recess 1124 and the protrusion 1050 with each other more easily.

The heating plate portion 1010 is provided with a transmission coil 1040 for wirelessly transmitting a power, and the container portion 1100 may be provided with a reception coil 1150 for wirelessly receiving a power.

Examples of the principle of the power transmitted and received wirelessly include a 'magnetic resonance system' and a 'magnetic induction system'. Basically, electricity is transmitted in such a manner that a current flows in a coil, and if a strong current flows in a coil wound in a round shape, a magnetism is generated and the generated magnetism is transferred to another coil if it is in contact with another coil. A reverse procedure of this procedure is the principle of the current.

Since the principle of the power is disclosed in various related arts, detailed description of a method for realizing the related arts will be omitted in this specification.

The transmission coil 1040 may be controlled separately from the working coil 1030.

Also, the working coil 1030 may fully be arranged on a sectional surface below the recess 1124. Since the working coil 1030 heats the container 1140, the working coil 1030 may be arranged to fully surround the sectional surface of the portion where the lower surface of the container 1140 is arranged.

On the other hand, the transmission coil 1040 may be arranged outside the working coil 1030, that is, outside the protrusion 1050. Since the transmission coil 1040 is not used to heat the container 1140, the transmission coil 1040 may be arranged regardless of the portion where the container 1140 is arranged.

The reception coil 1150 may be arranged to be close to the transmission coil 1040 to enhance efficiency of the power transmitted and received. Therefore, the reception coil 1150 may be arranged on an inclined surface of the recess 1124, and thus may be arranged to be close to the transmission coil 1040.

Meanwhile, since the container 1140 is not arranged on the portion where the reception coil 1150 is arranged, interference does not occur in selection of the positions of the working coil 1030 for heating the container 1140 and the reception coil 1150.

The container portion 1100 may be provided with a temperature sensor 1170 for measuring a temperature. The temperature sensor 1170 may be installed in the container portion 1100, which is provided with the container 1140 for receiving cooking food, not the heating plate portion 1010.

Therefore, in one embodiment of the present invention, a temperature related to cooking food may be measured more exactly than the related art in which a temperature sensor is installed in an element corresponding to a heating plate provided with an inverter. This is because that the temperature sensor 1170 according to this embodiment is arranged to be close to the container 1140 to directly measure the temperature of the container 1140. Also, since the temperature sensor 1170 is far away from the inverter, the temperature sensor 1170 is not affected by interference from the inverter.

Meanwhile, the container portion 1100 and the heating plate portion 1010 are completely detached from each other, a method for supplying a power for driving the temperature sensor 1170 is required. In this embodiment, the power may be transmitted and received wirelessly using the transmission coil 1040 and the reception coil 1150, and the power received by the reception coil 1150 may be supplied to the temperature sensor 1170.

Therefore, since the container portion 1100 and the heating plate portion 1010 are not connected with each other electrically, it is advantageous in that a problem such as electric shock does not occur when the user uses the container portion 1100.

The container portion 1100 may be provided with a display module 1104 displaying a temperature measured by the temperature sensor 1170.

The display module 1104 may be driven by the power received by the reception coil 1150. The display module 1104 may provide information on cooking food cooked in the container portion 1100, for example, information related to time elapsed after cooking starts, in addition to information related to the temperature transferred from the temperature sensor 1170.

The container portion 1100 may be provided with a heater 1160 for heating a side space in which cooking food is received, and the power received by the reception coil 1150 may be supplied to the heater 1160.

Since the working coil 1030 is arranged only at the lower portion of the container portion 1100, the lower portion of the container 1140 may be more heated relatively more quickly, whereby the cooking food may not be heated uniformly inside the container 1140.

Therefore, in this embodiment, the heater 1160 may separately be provided at the side of the container 1140, whereby the cooking food may be heated additionally by the heater 1160.

Meanwhile, since the heater 1160 is driven regardless of the working coil 1030, the current may be supplied to the transmission coil 1040 differently from the working coil 1030 to heat the container 1140.

For example, the current is supplied to the working coil 1030 to heat the container 1140, whereas the current may not be supplied to the transmission coil 1040 so as not to drive the heater 1160. In this case, the lower portion of the container 1140 may be relatively more heated than the side.

On the other hand, the current may not be supplied to the working coil 1030, and the current may be supplied to the transmission coil 1040 to drive the heater 1160 only. In this case, the side of the container 1140 may be heated.

On the contrary, an induction current may be supplied to the working coil 1030 and the transmission coil 1040, whereby the lower portion of the container 1140 may be heated while the heater 1160 is being driven. In this case, the cooking food may be heated more quickly and uniformly than the other case.

Particularly in this embodiment, the heating plate portion 1010, the container portion 1100 and the lid portion 1200 may detachably be provided.

Since the container portion 1100 and the lid portion 1200 are completely detached from each other, the user may clean the container portion 1100 separately from the lid portion 1200, and may clean the lid portion 1200 separately from the container portion 1100. Therefore, the cooking apparatus may be used more cleanly.

Meanwhile, a flange 1142 is formed on an upper surface of the container 1140, and the upper surface 1122 of the housing 1120 is formed to have a predetermined area, whereby a sufficient airtight force may be obtained when the lid portion 1200 is coupled with the container portion 1100.

Since the container 1140 and the housing 1120 are separate elements and made of their respective materials different from each other, they may be detached from each other.

Also, the heating plate portion 1010 and the container portion 1100 are not electrically connected with each other. Therefore, the heating plate portion 1010 and the container portion 1100 may completely be detached from each other, and a problem such as electric shock does not occur even though the container portion 1100 is washed with water.

Figure 10:
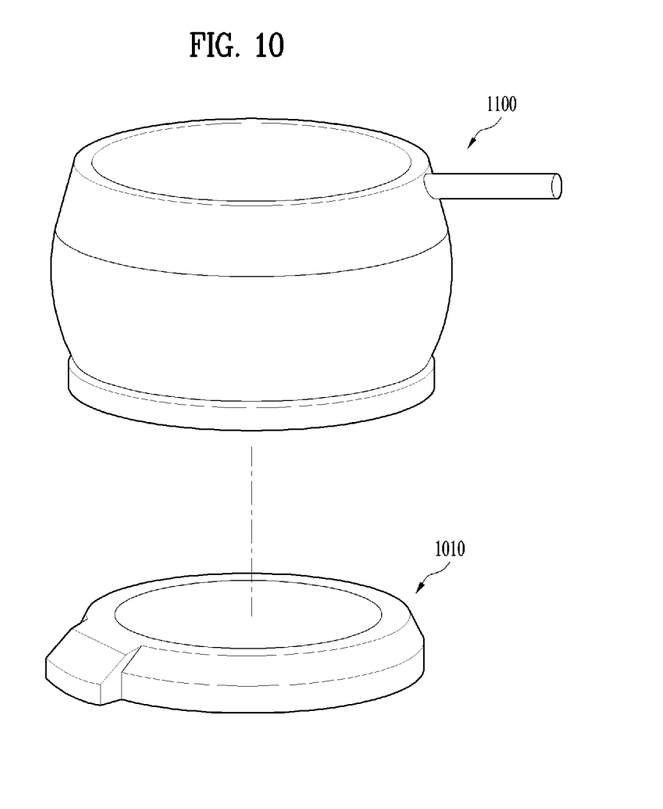
FIG. 10 is a view illustrating the state that another container portion is arranged on a heating plate portion in FIG. 7.

FIG. 10 is a view illustrating the state that another container portion is arranged on a heating plate portion in FIG. 7.

Referring to FIG. 10, since the container portion 1100 is completely detached from the heating plate portion 1010, another type container 100 made of a material, which may be heated by the working coil 1030, may be arranged on the heating plate portion 1010, whereby cooking may be performed.

That is, as shown in FIGS. 7 to 9, since the protrusion 1050 of the heating plate portion 1010 has a shape coupled with the recess 1124 of the container portion 1100, the container portion 1100 may easily be fixed to the heating plate portion 1010. On the other hand, since the heating plate portion 1010 has the protrusion 1050, if the container portion 1100 made of a material, which may be heated by the working coil 1030, is arranged on the upper portion of the protrusion 1050, the cooking food received in the container portion 1100 may be cooked.

Therefore, the heating plate portion 1010 may have versatility that allows various container portions to cook food while having a shape that may easily be coupled with a specific container portion.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A cooking apparatus comprising:
   a first housing provided with an inverter configured to generate an electric current and a cooling fan configured to cool the inverter; and
   a second housing including a working coil to which the current from the inverter is transferred, the working coil being configured to generate heat to heat a container that is placed on the second housing,
   wherein the first housing and the second housing constitute spaces detached from each other, wherein the inverter includes a PCB substrate arranged so as not to overlap with the cooling fan, wherein the first housing includes a ventilator that exhausts air from the cooling fan to an outside of the first housing and a through hole that allows air to enter the first housing, wherein the through hole is formed at a first side of the first housing corresponding to the inverter, and the ventilator is formed at a second side of the first housing corresponding to the cooling fan, and wherein the first side and the second side are separated by a prescribed distance along a horizontal axis,
   wherein the first housing includes a display module that provides information related to the cooking apparatus and a control panel providing a user with an interface to allow the user to turn on/off the inverter or control a heating temperature.

2. The cooking apparatus according to claim 1, wherein corner portions of the first housing and the second housing are connected with each other.

3. The cooking apparatus according to claim 1, wherein the first housing and the second housing are arranged to be perpendicular to each other.

4. The cooking apparatus according to claim 1, wherein a relative position of the first housing is changed with respect to the second housing.

5. The cooking apparatus according to claim 4, further comprising a hinge unit connecting the first housing with the second housing, wherein the first housing and the second housing are folded to be overlapped with each other based on the hinge unit.

6. The cooking apparatus according to claim 1, wherein the inverter and the working coil are electrically connected with each other by an electric wire, and a part of the electric wire is arranged in the first housing, and the other part of the electric wire is arranged in the second housing.

7. The cooking apparatus according to claim 1, wherein the first housing includes a motor for providing a rotational force and a transfer member for transferring the rotational force of the motor, and cooking food inside the container is stirred by the rotational force transferred by the transfer member.

8. The cooking apparatus according to claim 7, wherein the transfer member is rotatably coupled with the first housing.

9. The cooking apparatus according to claim 7, wherein the first housing is provided with an insertion portion into which the transfer member is inserted by rotation.

* * * * *